(12) United States Patent
Kim et al.

(10) Patent No.: US 8,852,448 B2
(45) Date of Patent: Oct. 7, 2014

(54) METHOD FOR FABRICATING 3D STRUCTURE HAVING HYDROPHOBIC SURFACE BY DIPPING METHOD

(75) Inventors: Dong-Seob Kim, Pohang-si (KR);
Kun-Hong Lee, Pohang-si (KR);
Woon-Bong Hwang, Pohang-si (KR);
Geun-Bae Lim, Pohang-si (KR);
Hyun-Chul Park, Pohang-si (KR);
Byeong-Joo Lee, Pohang-si (KR);
Sang-Min Lee, Seoul (KR); Joon-Won Kim, Pohang-si (KR)

(73) Assignee: Postech Academy-Industry Foundation, Pohang (KR)

( * ) Notice: Subject to any disclaimer, the term of this patent is extended or adjusted under 35 U.S.C. 154(b) by 530 days.

(21) Appl. No.: 12/921,217

(22) PCT Filed: Mar. 12, 2009

(86) PCT No.: PCT/KR2009/001252
§ 371 (c)(1),
(2), (4) Date: Sep. 7, 2010

(87) PCT Pub. No.: WO2009/113824
PCT Pub. Date: Sep. 17, 2009

(65) Prior Publication Data
US 2011/0042350 A1   Feb. 24, 2011

(30) Foreign Application Priority Data
Mar. 14, 2008  (KR) .................... 10-2008-0024029

(51) Int. Cl.
*H01L 21/302* (2006.01)
*H01L 21/461* (2006.01)
(Continued)

(52) U.S. Cl.
CPC .............. *C23C 2/12* (2013.01); *B29C 33/424* (2013.01); *C23C 2/26* (2013.01); *B29C 39/34* (2013.01); *C25D 11/04* (2013.01)

USPC ............ 216/32; 438/689; 438/694; 438/700; 216/39; 427/133

(58) Field of Classification Search
None
See application file for complete search history.

(56) References Cited

U.S. PATENT DOCUMENTS

| 3,937,858 | A | * | 2/1976 | Thiele | .......................... 427/431 |
| 4,882,233 | A | * | 11/1989 | Ramaprasad | ................. 428/620 |
| 2001/0010973 | A1 | * | 8/2001 | Aiba et al. | ..................... 438/704 |

FOREIGN PATENT DOCUMENTS

| JP | 56-060618 | 5/1981 |
| JP | 64-004437 | 1/1989 |

(Continued)

OTHER PUBLICATIONS

D. Kim, et al., "Superhydrophobic nanostructures based on porous alumina", Current Applied Physics, North-Holland, vol. 8, No. 6, Oct. 10, 2007, pp. 770-773.

*Primary Examiner* — Nadine Norton
*Assistant Examiner* — Stephanie Duclair
(74) *Attorney, Agent, or Firm* — Lexyoume IP Meister, PLLC

(57) ABSTRACT

A method for fabricating a 3D (three-dimensional) structure is disclosed to provide hydrophobicity to a surface of a 3D structure by using a dipping method in which a predetermined-shaped structure is immersed in a molten metal solution. The method includes: immersing a predetermined-shaped structure in a molten metal solution to coat a molten metal material on the surface of the predetermined-shaped structure; anodizing a metal base coated with the molten metal material; coating a polymer material on an outer surface of the metal-coated base to form a negative replica structure; covering an outer surface of the negative replica structure with an outer formation material; and removing the metal-coated base from the negative replica structure and the outer formation material.

13 Claims, 5 Drawing Sheets

(51) Int. Cl.
*H01L 21/311* (2006.01)
*B44C 1/22* (2006.01)
*B23P 15/00* (2006.01)
*C03C 25/00* (2006.01)
*C23F 1/00* (2006.01)
*B29C 33/42* (2006.01)
*C23C 2/26* (2006.01)
*B29C 39/34* (2006.01)
*C23C 2/12* (2006.01)
*C25D 11/04* (2006.01)

(56) References Cited

FOREIGN PATENT DOCUMENTS

| | | |
|---|---|---|
| JP | 10-278277 | 10/1998 |
| JP | 2001-254163 | 9/2001 |
| JP | 2006-273607 | 10/2006 |
| KR | 10-2006-0052327 * | 5/2006 |
| KR | 10-2008-0004409 | 1/2008 |
| KR | 10-2008-0004410 | 1/2008 |
| KR | 10-2008-0026776 | 3/2008 |
| WO | 2007/130294 | 11/2007 |

\* cited by examiner

METHOD FOR FABRICATING 3D STRUCTURE HAVING HYDROPHOBIC SURFACE BY DIPPING METHOD

TECHNICAL FIELD

The present invention relates to a method for fabricating a 3D (three-dimension) structure (or 3D-shaped structure) having a hydrophobic surface and, more particularly, to a method for fabricating a 3D structure that is capable of providing hydrophobicity to a surface of a 3D structure by using a dipping method in which a particular-shaped structure is immersed in a molten metal solution.

BACKGROUND ART

In general, the surface of a solid base material such as a metal or polymer has a specific surface energy.

The specific surface energy appears as a contact angle between a liquid and a solid when the liquid contacts the solid.

Here, the liquid generally refers to water or oil, etc., and water shall be representatively mentioned as the liquid hereinafter.

If the contact angle is smaller than 90° a spherical water drop loses its form on the surface of the solid to wet the surface of the solid, exhibiting wettability.

If, however, the contact angle is larger than 90° the spherical water drop maintains its form on the surface of the solid to easily flow by an external force rather than wet the surface of the solid, exhibiting non-wettability.

For example, if a water drop falls on a lotus leaf, it does not wet the lotus leaf but flows on the surface of the lotus leaf. This phenomenon indicates the non-wettability.

The value of the specific contact angle on the surface of the solid base material may change if the surface is processed to have fine protrusions and depressions (unevenness).

Namely, a hydrophilic surface having a contact angle of smaller than 90 can have greater wettability through surface processing, and a hydrophobic surface having a contact angle of larger than 90° can have greater non-wettability through surface processing.

The hydrophobic surface of the solid base material may be applicable in various manners.

If the hydrophobic surface is applied to a piping structure, flow of liquid in a pipe can be facilitated to increase the quantity of flow and flow velocity.

Thus, the application of the hydrophobic surface to a water service pipe or a boiler pipe can considerably reduce accumulation of foreign substances compared with the related art.

In addition, if a polymer material is used for the hydrophobic surface, the inner surface of the pipe can be prevented from being corroded, and accordingly, water pollution can be reduced.

However, a technique for changing the contact angle on the surface of the solid for an arbitrary purpose is known, to date, as a MEMS (Micro Electro Mechanical Systems) process to which a semiconductor fabrication technique is applied, whereby the surface of the solid is formed to have fine protrusions and depressions of micro- or nano-scale.

The MEMS process is an up-to-date technique employing the semiconductor technique by mechanical engineering, but the semiconductor process incurs much costs.

Namely, in order to form the protrusions and depressions of a nano-scale on the surface of the solid by using the MEMS process, operations such as oxidizing the metal surface, applying certain temperatures and certain voltages, and oxidizing and etching in a special solution are performed.

The MEMS process cannot be performed in a general working environment but should be performed in a specially fabricated clean room, and machines required for the operation are high-priced equipment.

In addition, the MEMS process is disadvantageous in that it cannot process a large surface at one time.

Thus, because the existing technique for forming the hydrophobic surface has a very complicated process, is not suitable for mass-production, and incurs high fabrication costs, its application is not easy.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method for fabricating a 3D (three-dimensional) structure having hydrophobic surface having advantages of simplifying the process to allow mass-production, compared with the related art.

Also, the present invention provides a method for easily fabricating a 3D structure having a hydrophobic surface by using a dipping method in which a particular-shaped structure is immersed in a molten metal solution.

Technical Solution

An exemplary embodiment of the present invention provides a method for fabricating a 3D structure having a hydrophobic surface by using a dipping method, including: immersing a predetermined-shaped structure in a molten metal solution to coat a molten metal material on the surface of the predetermined-shaped structure; anodizing a metal base coated with the metal melting material to form nano-scale holes on the outer surface of the metal-coated base; coating a polymer material on an outer surface of the metal-coated base to form the polymer material as a negative replica structure corresponding to the nano-scale holes of the metal-coated base; covering an outer surface of the negative replica structure with an outer formation material; and removing the metal-coated base from the negative replica structure and the outer formation material.

In the exemplary embodiment of the present invention, the molten metal solution may be a molten aluminum solution prepared by melting aluminum.

The method according to the exemplary embodiment of the present invention may further include preparing the molten metal solution by melting aluminum in a solid state.

According to the exemplary embodiment of the present invention, the predetermined-shaped structure may be electropolished in an electrolyte solution to planarize the surface of the predetermined-shaped structure.

According to the exemplary embodiment of the present invention, the coating thickness of the predetermined-shaped structure may be adjusted by differentiating a time period during which the predetermined-shaped structure is immersed in the molten metal solution.

According to the exemplary embodiment of the present invention, the predetermined-shaped structure may be taken out of the molten metal solution, and then dried and hardened at a predetermined temperature.

The method according to the exemplary embodiment of the present invention may further include spraying micro-scale particles to form micro-scale protrusions and depressions on the outer surface of the metal-coated base.

According to the exemplary embodiment of the present invention, while coating the polymer material, the polymer material may be injected into the nano-scale holes of the metal-coated base, such that the negative replica structure includes a plurality of pillars corresponding to the nano-scale holes.

According to the exemplary embodiment of the present invention, the polymer material may be at least one selected from the group consisting of PTFE (polytetrafluorethylene), a FEP (fluorinated ethylene propylene) copolymer, and a PFA (perfluoroalkoxy).

According to the exemplary embodiment of the present invention, the metal-coated base is removed through chemical etching.

Advantageous Effects

As described above, the method for fabricating the 3D structure according to the exemplary embodiment of the present invention has such an advantage that because the hydrophobicity can be provided to the surface of the 3D shape structure without using such high-priced equipment as in the related art MEMS process, the fabrication costs can be reduced and the process can be simplified.

In addition, in the method for fabricating the 3D shape structure according to the exemplary embodiment of the present invention, the anodizing process is performed by forming the aluminum-coated layer only on the surface of the metal base material by using a dipping method, without using a metal base material made of an aluminum material.

Thus, although anodizing is performed, the 3D structure can be fabricated at a relatively low cost while reducing a loss of the material.

DESCRIPTION OF REFERENCE NUMERALS INDICATING PRIMARY ELEMENTS IN THE DRAWINGS

Figure 1:
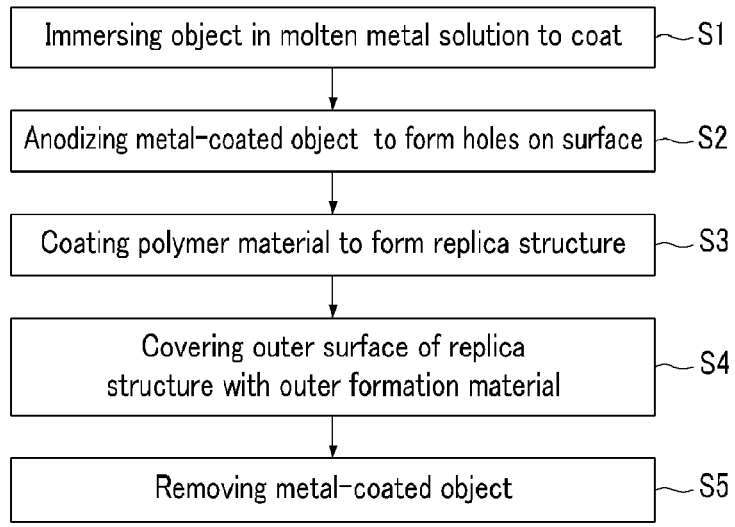
FIG. 1 is a flow chart illustrating the process of a method for fabricating a 3D (three-dimensional) structure having a hydrophobic surface according to an exemplary embodiment of the present invention.

10: particle injector 20: anodizing device
30: negative replication device 100: 3D structure
101: predetermined-shaped structure 110: metal-coated layer
120: anodized layer 130: negative replica structure
140: outer formation material Mode For The Invention The exemplary embodiments of the present invention will now be described in detail with reference to the accompanying drawings such that a skilled person in the art can easily perform the present invention.

As those skilled in the art would realize, the described embodiments may be modified in various different ways, all without departing from the spirit or scope of the present invention.

In the present invention, "micro-scale" is defined as a size in the range equal to or more than 1 µm and less than 1000 µm, and "nano-scale" is defined as a size in the range equal to or more than 1 nm and less than 1000 nm.

FIG. 1 is a flow chart illustrating the process of a method for fabricating a 3D (three-dimensional) structure having a hydrophobic surface according to an exemplary embodiment of the present invention.

As shown in FIG. 1, the method for fabricating a 3D structure having a hydrophobic surface includes a step of immersing S1, a step of anodizing S2, a step of coating polymer material S3, a step of covering S4, and a step of removing S5.

By performing such steps, a structure having a hydrophobic surface can be fabricated in a simple manner at a low cost according to the exemplary embodiment of the present invention, compared with the related art MEMS (Micro Electro Mechanical Systems) process.

In addition, the 3D structure can be fabricated such that its inner surface is provided with hydrophobicity according to the fabrication steps.

Figure 2:
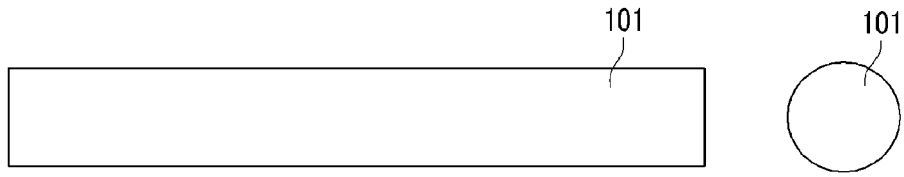
FIG. 2 is a schematic diagram showing a predetermined-shaped structure in one of sequential processes of a method for fabricating a 3D structure having the hydrophobic surface in FIG. 1.

FIGS. 2 to 7 are schematic diagrams sequentially showing a fabrication process of the method for fabricating the 3D structure having a hydrophobic surface in FIG. 1. FIG. 2 is a schematic diagram showing a predetermined-shaped structure.

As shown in FIG. 2, a predetermined-shaped structure 101 according to the exemplary embodiment of the present invention is a cylindrical object to be used for providing hydrophobicity to an inner surface of a pipe structure.

In the exemplary embodiment of the present invention, the predetermined-shaped structure 101 is immersed in a solution obtained by mixing perchloric acid and ethanol in a 1:4 volume ratio and then electropolishing to planarize the predetermined-shaped structure 101.

In the exemplary embodiment of the present invention, a molten metal solution is prepared by melting a solid metal in a container such as a crucible in an advance preparation step.

Aluminum has properties of allowing nano-scale holes to be easily formed through anodization (to be described), so a molten aluminum solution prepared by melting aluminum is used as the molten metal solution in the exemplary embodiment of the present invention.

As the predetermined-shaped structure 101 is immersed in the molten metal solution, the molten metal material can be coated on the surface of the predetermined-shaped structure 101.

With the molten metal material, the thickness of a metal-coated layer 110 varies depending on various conditions such as time in which the predetermined-shaped structure 101 is immersed in the molten metal solution, or surface friction of the predetermined-shaped structure 101.

Thus, in the exemplary embodiment of the present invention, the thickness of coating is minutely adjusted by varying time in which the predetermined-shaped structure 101 is immersed in the molten metal solution.

The predetermined-shaped structure 101 coated with the molten metal material is taken out of the molten metal solution, and then dried and hardened at a pre-set temperature.

Figure 3:
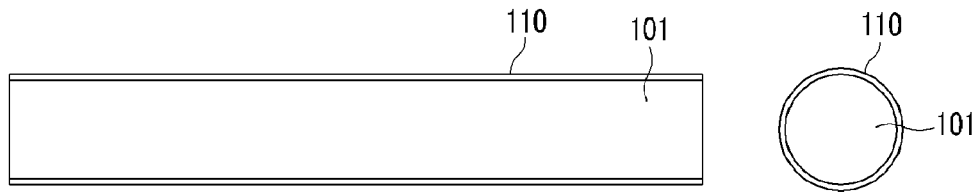
FIG. 3 is a schematic diagram showing a state in which a molten metal solution is coated on a surface of the predetermined-shaped structure in FIG. 2.

Then, the metal-coated layer 110 is formed on a surface of the predetermined-shaped structure 101 as shown in FIG. 3.

In the exemplary embodiment of the present invention, the predetermined-shaped structure 101 with the metal-coating layer 110 formed thereon will be designated as "metal-coated base".

Figure 8:
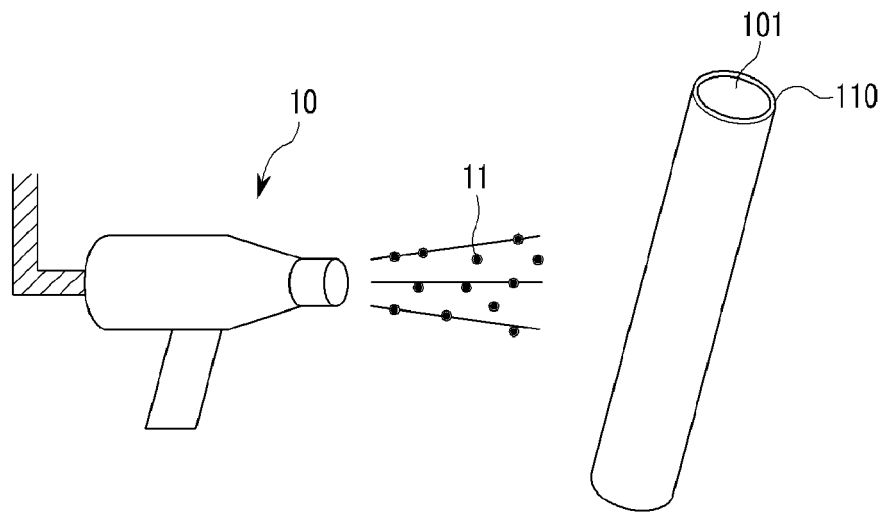
FIG. 8 is a schematic diagram showing a particle injector for forming micro-scale protrusions and depressions on the metal-coated base in FIG. 3.

FIG. 8 is a schematic diagram showing a particle injector for forming micro-scale protrusions and depressions on the metal-coated base 110 in FIG. 3.

As shown in FIGS. 1, 3, and 8, in the exemplary embodiment of the present invention, micro-scale particles are sprayed to form micro-scale protrusions and depressions on the outer surface of the metal-coated base.

To spray the micro-scale particles, a particle injector 10 is used in the exemplary embodiment of the present invention.

The particle injector 10 makes the micro-scale particles 11 collide with the surface of the metal-coated base at an arbitrary speed and pressure.

Then, as the metal-coated base is deformed by the impact energy of the particles 11, micro-scale protrusions and depressions are formed on the outer surface of the metal-coated layer 110.

In particular, in the exemplary embodiment of the present invention, the metal-coated base is rotated while the particles 11 are being sprayed to allow protrusions and depressions of a micro-scale to be evenly distributed on the surface of the metal-coated layer 110.

The particle injector 10 used in the exemplary embodiment of the present invention is a sand blaster for spraying sand particles, and a fine particle injector for spraying fine particles such as metal balls instead of sand particles may alternatively be used.

In this case, however, if the thickness of the metal-coated layer 110 is smaller than a predetermined thickness value, the metal-coated layer 110 might be removed while the particles are sprayed, so the step of spraying particles may not be performed as necessary.

Figure 4:
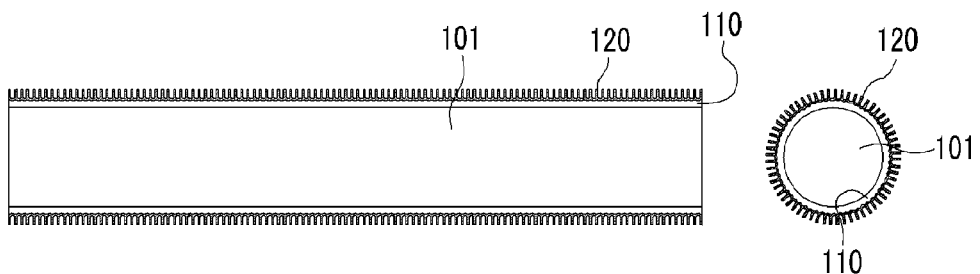
FIG. 4 is a schematic diagram showing a state in which an anodized layer is formed on the surface of a metal-coated base in FIG. 3.
Figure 9:
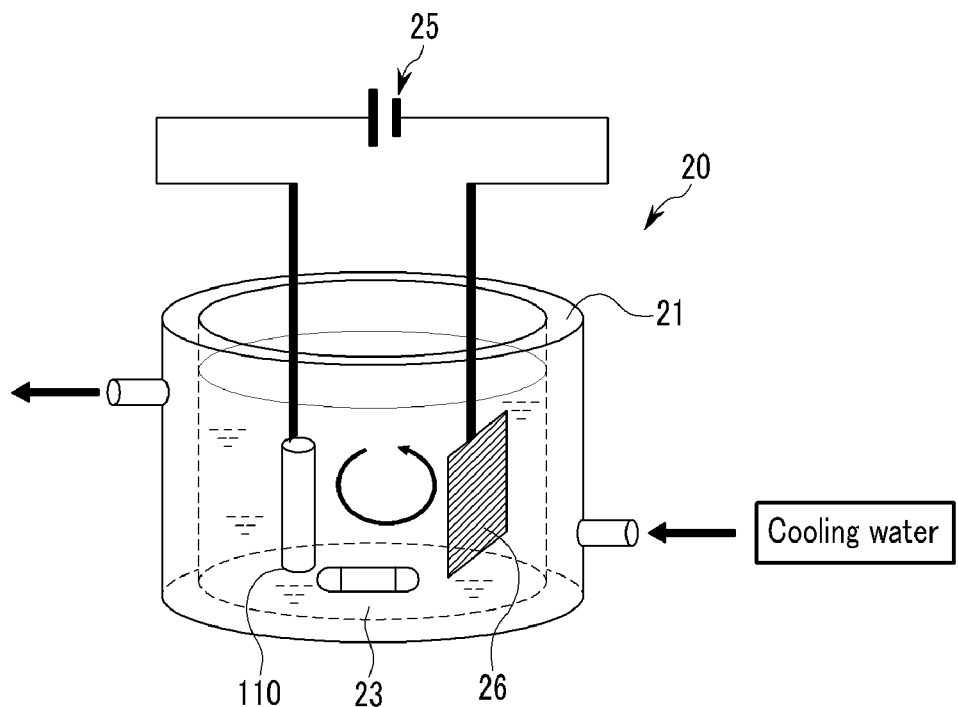
FIG. 9 is a schematic diagram showing an anodizing device for anodizing the metal-coated base in FIG. 4.

FIG. 9 is a schematic diagram showing an anodizing device for anodizing the metal-coated base in FIG. 4.

As shown in FIGS. 1, 4, and 9, in the exemplary embodiment of the present invention, anodizing S2 is performed to form nano-scale holes on the outer surface of the metal-coated base by anodizing the metal-coated base.

In anodizing, the metal-coated base is immersed in an electrolyte solution 23 and then electrodes are applied thereto to form an anodized layer 120 on the surface of the metal-coated base.

For anodizing, an anodizing device 20 as shown in FIG. 9 is used in the exemplary embodiment of the present invention.

In the anodizing device 20, a certain amount of the electrolyte solution 23 (e.g., 0.3 M oxalic acid $C_2H_2O_4$, or phosphoric acid) is filled in an internal receiving space of a main body 21 for anodizing, in which the metal-coated base is immersed.

The oxidizing device 20 includes a power supply unit 25, and the metal-coated base is connected to one of an anode and a cathode of the power supply unit 25, and a different metal base material 26 of platinum is connected to the other remaining terminal of the power supply unit 25.

Here, the different metal base material 26 can be any material so long as it is a conductor that is available for power application.

Under experimental conditions, the power supply unit 25 applies a predetermined constant voltage (e.g., 60V) to the metal-coated base and the different metal base material 26 is maintained at a predetermined distance (e.g., 50 mm) therebetween.

In this case, the electrolyte solution 23, which is maintained at a certain temperature (e.g., 15° C.), is stirred by a stirrer to prevent a local deviation of solution density.

Then, alumina is formed as the anodized layer 120 on the surface of the metal-coated base.

After the anodizing is performed, the metal-coated base is taken out of the electrolyte solution 23, washed with deionized water (e.g., for about 15 minutes), and then dried in an oven at a pre-set temperature (e.g., 60° C.) for a certain time period (e.g., about one hour).

Figure 10:
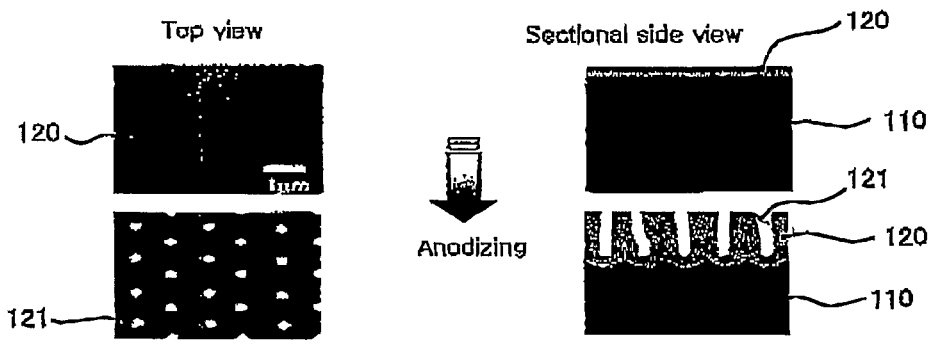
FIG. 10 is an enlarged view showing nano-scale holes formed on the anodized layer after anodizing the metal-coated base in FIG. 9.

Then, holes 121 having a nano-meter unit diameter as shown in FIG. 10 are formed on the anodized layer 120 of the metal-coated base.

Figure 5:
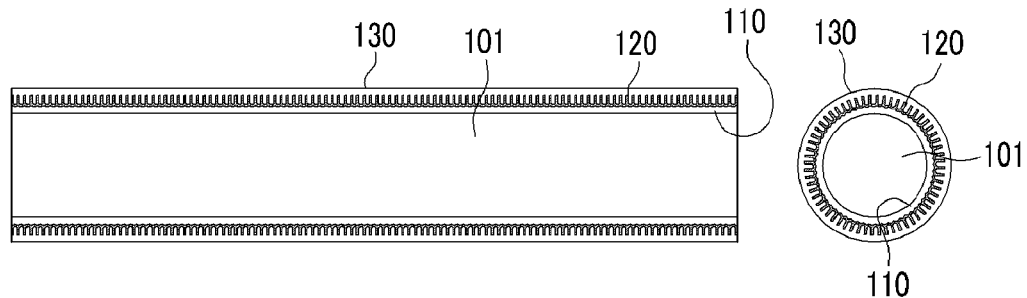
FIG. 5 is a schematic diagram showing a state in which a negative replica structure is formed on the surface of the metal-coated base in FIG. 4.
Figure 11:
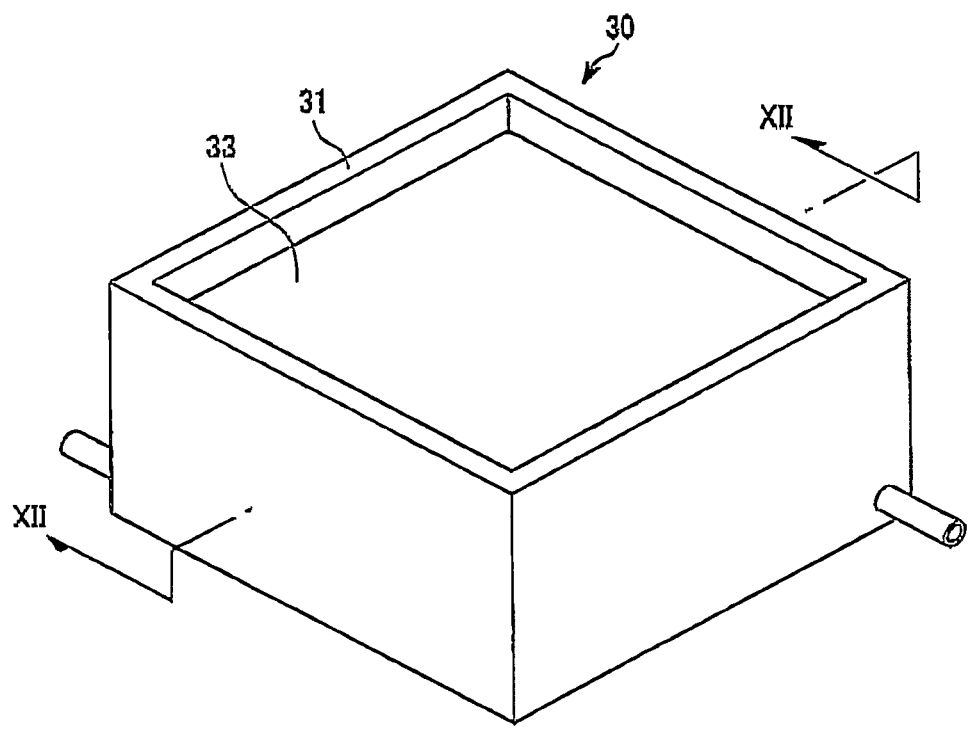
FIG. 11 is a schematic diagram showing a negative replication device for replicating the negative replica shape corresponding to the nano-scale holes of the anodized layer in FIG. 5.
Figure 12:
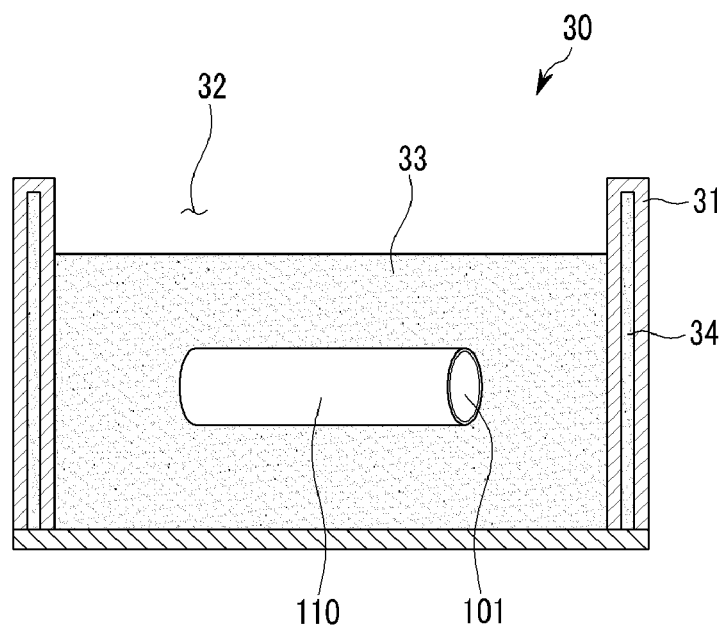
FIG. 12 is a cross-sectional view of the negative replication device taken along the line XII-XII in FIG. 11.

FIG. 11 is a schematic diagram showing a negative replication device for replicating the negative replica shape corresponding to the nano-scale holes of the anodized layer in FIG. 5, and FIG. 12 is a cross-sectional view of the negative replication device taken along the line XII-XII in FIG. 11.

As shown in FIGS. 1, 5, 11, and 12, in the exemplary embodiment of the present invention, a polymer material is coated on the anodized layer 120 corresponding to the outer surface of the metal-coated base.

Then, the polymer material is formed as a negative replica structure 130 corresponding to the nano-scale holes 121 of the anodized layer 120.

Namely, in the exemplary embodiment of the present invention, the step of coating polymer material S3 is performed to form the negative replica structure 130 on the surface of the metal-coated base.

In the exemplary embodiment of the present invention, the metal-coated base having the holes 121 of a nano-scale is provided as a replication template, and a negative replication device 30 as shown in FIGS. 11 and 12 is used to perform the step of anodizing S2.

In the exemplary embodiment of the present invention, the negative replication device 30 includes a body 31, a receiving part 32 having a certain receiving space in the body 31, a polymer solution 33 received in the receiving part 32, and a cooling unit 34 provided along the side of the body 31 and coagulating the polymer solution 33 within the receiving part 32 so as to be solidified.

In the negative replication device 30, the metal-coated base is immersed as the replicating template in the polymer solution 33, and a polymer material is coated on the anodized layer 120 of the metal-coated base.

That is, the polymer solution 33 is injected into the nano-scale holes 121 of the anodized layer 120, and as the cooling unit 34 of the negative replication device 30 operates, the polymer material contacting the metal-coated base is solidified.

In this manner, in the exemplary embodiment of the present invention, the negative replica structure 130 having the negative shape surface corresponding to the shape of the nano-scale holes 121 is formed by coating the polymer material on the outer surface of the anodized layer 120.

That is, because the negative replica structure 130 is the negative shape surface corresponding to the nano-scale holes 121, it includes a plurality of pillars corresponding to the respective nano-scale holes 121.

The polymer solution 33 is made of one material selected from the group consisting of PTFE (polytetrafluoroethylene), an FEP (fluorinated ethylene propylene) copolymer, and a PFA (perfluoroalkoxy).

Figure 6:
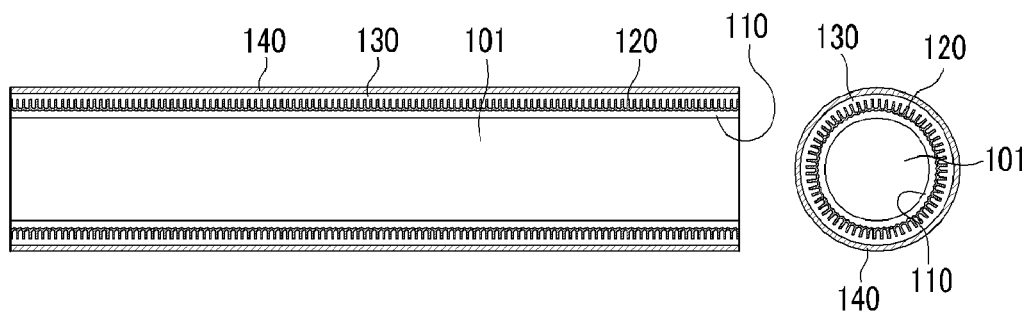
FIG. 6 is a schematic diagram showing a state in which an outer formation material is attached on an outer surface of the negative replica structure in FIG. 5.

Next, in the exemplary embodiment of the present invention, as shown in FIG. 6, a step of covering S4 is performed to cover the outer surface of the negative replica structure 130 with an outer formation material 140.

The outer formation material 140 is a material with a particular viscosity and flexibility so as to be attached on the uneven outer surface of the negative replica structure 130.

In particular, the exemplary embodiment of the present invention exemplarily shows the method for fabricating a pipe structure having a hydrophobic inner surface, so the circumferential surface of the cylindrical metal-coated base is covered with an acrylic film to be used as a pipe material.

As the outer formation material 140, various materials other than the acrylic film may be used.

Thereafter, in the exemplary embodiment of the present invention, the metal-coated base with the anodized layer 120 formed thereon is removed from the negative replica structure 130 and the outer formation material 140 (S5).

In this case, if the predetermined-shaped structure 101 of the metal-coated base is a non-metallic material, it can be separated according to a mechanical method, and if the predetermined-shaped structure 101 is a metallic material, it may be removed according to a chemical method such as etching.

After the predetermined-shaped structure 101 is removed, the metal-coated layer 110 and the anodized layer 120 are removed through wet etching.

Figure 7:
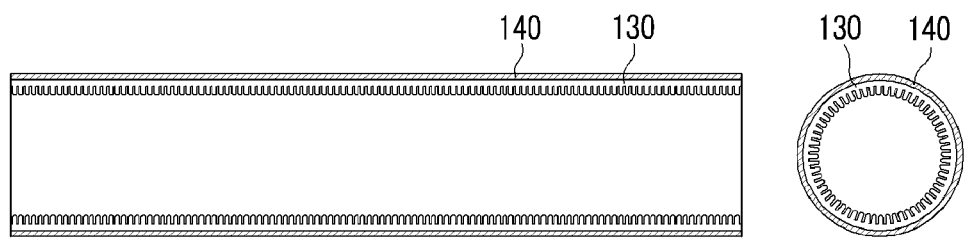
FIG. 7 is a schematic diagram showing a state in which the metal-coated base and the anodized layer in FIG. 6 are removed to leave the negative replica structure and the outer formation material.

By performing such steps in the exemplary embodiment of the present invention, the negative replica structure 130 and the outer formation material 140 remain as shown in FIG. 7.

As mentioned above, with the plurality of nano-scale pillars formed on the inner surface, the negative replica structure 130 finally obtains the hydrophobic surface of a nano-scale.

That is, because the negative replica structure 130 has such a sectional structure of the internal surface as that of a lotus leaf, it has the hydrophobic surface qualities with minimized wetting characteristics, and accordingly, a contact angle between the negative replica structure 130 and a liquid can be drastically increased to more than 160°.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for fabricating a 3D (three-dimensional) structure having a hydrophobic surface using a dipping method, comprising:
   immersing a predetermined-shaped structure in a molten metal solution to coat a molten metal material on an outer surface of the predetermined-shaped structure having the 3D structure, thus forming a metal base coated with the molten metal material;
   anodizing the formed metal-coated base to form nano-scale holes on an outer surface of the metal-coated base;
   coating a polymer material on the anodized outer surface of the metal-coated base to form the polymer material as a negative replica structure corresponding to the nano-scale holes of the metal-coated base;
   covering an outer surface of the negative replica structure with an outer formation material; and
   removing the metal-coated base with the holes formed on the outer surface from an inner surface of the negative replica structure covered with the outer formation material, resulting in the 3D structure formed with the remaining negative replica structure and outer formation material such that the formed 3D structure has an outer surface covered with the outer formation material and the hydrophobic inner surface.

2. The method of claim 1, wherein the molten metal solution is a molten aluminum solution prepared by melting aluminum.

3. The method of claim 2, further comprising preparing the molten metal solution by melting aluminum in a solid state.

4. The method of claim 1, wherein the predetermined-shaped structure is electropolished in an electrolyte solution to planarize the surface of the predetermined-shaped structure.

5. The method of claim 1, wherein the coating thickness of the predetermined-shaped structure is adjusted by differentiating a time period during which the predetermined-shaped structure is immersed in the molten metal solution.

6. The method of claim 1, wherein the predetermined-shaped structure is taken out of the molten metal solution, and then dried and hardened at a predetermined temperature.

7. The method of claim 1, further comprising spraying micro-scale particles to form micro-scale protrusions and depressions on the outer surface of the metal-coated base.

8. The method of claim 1, wherein, while coating the polymer material, the polymer material is injected into the nano-scale holes of the metal-coated base, such that the negative replica structure comprises a plurality of pillars corresponding to the nano-scale holes.

9. The method of claim 8, wherein the polymer material is at least one selected from the group consisting of PTFE (polytetrafluoroethylene), an FEP (fluorinated ethylene propylene) copolymer, and a PFA (perfluoroalkoxy).

10. The method of claim 1, wherein the metal-coated base is removed through chemical etching.

11. The method of claim 1, wherein the hydrophobic inner surface of the fabricated 3D structure is provided by a plurality of nano-scale pillars corresponding to the respective nano-scale holes.

12. The method of claim 1, wherein the predetermined-shaped structure comprises a cylindrical object.

13. The method of claim 1, wherein the formed 3D structure comprises a pipe structure having a hydrophobic inner surface.

* * * * *